United States Patent [19]
Rege et al.

[11] Patent Number: 5,361,372
[45] Date of Patent: Nov. 1, 1994

[54] MEMORY MANAGEMENT FOR DATA TRANSMISSION NETWORKS

[75] Inventors: Satish L. Rege, Groton, Mass.; Ronald M. Edgar, Raymond, N.H.

[73] Assignee: Digital Equipment Corporation, Maynard, Mass.

[21] Appl. No.: 815,093

[22] Filed: Dec. 27, 1991

[51] Int. Cl.⁵ ............................................. G06F 12/02
[52] U.S. Cl. .................................... 395/800; 395/250; 370/85.1; 370/94.1; 364/DIG. 2
[58] Field of Search ............... 395/800, 425, 325, 200, 395/400, 650, 250; 364/DIG. 1, DIG. 2, 939, 940.63, 940.64, 944.7, 941.1; 370/85.1, 94.1, 60, 85

[56] References Cited

U.S. PATENT DOCUMENTS

| | | | |
|---|---|---|---|
| 4,488,289 | 12/1984 | Turner | 370/60 |
| 4,521,882 | 6/1985 | Gabrielli et al. | 370/85.5 |
| 4,692,918 | 9/1987 | Elliott et al. | 370/85.13 |
| 4,777,595 | 10/1988 | Strecker et al. | 395/200 |
| 4,864,560 | 9/1989 | Quinquis et al. | 370/60 |
| 4,866,704 | 9/1989 | Bergman | 370/85.4 |
| 4,953,157 | 8/1990 | Franklin et al. | 370/60 |
| 4,985,890 | 1/1991 | Matsumoto et al. | 370/94.1 |
| 5,016,248 | 5/1991 | Kudoh | 370/94.1 |
| 5,043,981 | 8/1991 | Firoozmand et al. | 370/85.1 |
| 5,079,762 | 12/1992 | Tanabe | 370/60 |
| 5,187,780 | 2/1993 | Clark et al. | 395/325 |

OTHER PUBLICATIONS

Bartee, *ISDN DECnetTM, and SNA Communications*, Ch. 7 (Howard W. Sams & Company, 1989).

*Primary Examiner*—Alyssa H. Bowler
*Assistant Examiner*—Dzung C. Nguyen
*Attorney, Agent, or Firm*—Albert P. Cefalo; Denis G. Maloney

[57] ABSTRACT

An apparatus for memory management in network systems provides added margins of reliability for the receipt of vital maintenance operations protocol (MOP) and station management packets (SMP). In addition, additional overflow allocations of buffers are assigned for receipt of critical system packets which otherwise would typically be discarded in the event of a highly congested system. Thus, if a MOP or a SMP packet is received from the network when the allocated space for storing these types of packets in full, the packets are stored in the overflow allocations, and thus the critical packets are not lost.

5 Claims, 12 Drawing Sheets

FORWARDING VECTOR
PRODUCED BY PARSER

MEMORY MANAGEMENT FOR DATA TRANSMISSION NETWORKS

FIELD OF THE INVENTION

This invention relates to memory management in data transmission networks, particularly in token-ring packet-switched network adapters.

BACKGROUND OF THE INVENTION

A token ring network comprises of a set of stations serially connected by a transmission medium. Information is transferred sequentially from one station to the next. Each station generally regenerates and repeats each packet and serves as the means for attaching one or more devices to the ring for the purpose of communicating with other devices on the network. A given station transmits a packet onto the ring, where the packet circulates from one station to the next. The addressed destination station(s) copies the packet as it passes. Finally, the station that transmitted the packet effectively removes the packet from the ring.

A station gains the right to transmit a packet onto the medium when it detects a token packet passing on the medium. The token packet is a control packet comprised of a unique signalling sequence that circulates on the medium following each packet transfer. A station which wants to transmit a packet captures the token packet by modifying its' fields. The station then transmits it's packet, and upon the completion of the transmission, issues a new token packet into the ring.

Examples of packet-switched networks are described, for example, in Thomas C. Bartee, 1989, "ISDN, DECnetTM, and SNA Communications", Howard W. Sams & Company, incorporated herein by reference.

In packet-switched networks information bits are grouped into blocks, or packets, at a send station (sender), transmitted in serial format and then reassembled into the original form at a receive (receiver) station. Users or hosts (typically data terminals or computers having parallel data busses) are attached to the transmission medium at nodes. At each node, an adapter converts the serial data packets for parallel processing by the host. The transmitted data packets for parallel processing may comprise information data packets as well as network management data packets and network maintenance data packets.

In high bandwidth (high speed) packet-switched data transmission networks, thousands of data packets may be transmitted and received per second. Each adapter should incorporate adequate resources for processing received data packets to avoid loss of data, especially network management and network maintenance data.

During data packet transmission, data is transmitted to a destination, and an acknowledgement automatically is returned indicating that a data packet has been received. One method of ensuring reliability is by buffering the data packet at the sender, thereby saving a copy of each message sent until an acknowledgement for that message is returned. When no acknowledgement is returned within a predetermined time period, the data packet is resent, a function known as "retry". A drawback of this solution is that it may flood an already congested system with copies of the same data packet. However, this method greatly increases reliability because the data packet has a higher probability of eventually reaching its destination.

Not every data packet transmitted over a network may initiate automatic "retry" transmission management. Typically station management packets and maintenance operations protocol (MOP) packets are not retried due to the origin of the data packets. MOP and station management command data packets are initiated manually, whereas other types of data packets are initiated through internal system software. For example, one type of MOP packet is a reboot message sent by an external user. When the reboot data packet is transmitted, the external user must judge whether the data packet reaches the desired receiver, and if it can be visually determined that it did not, the command must be re-executed. Because these commands are manually entered, there are no software hooks, such as the automatic retry mechanism, to ensure that the data to be transmitted reaches its destination. Other types of station management and MOP packets handle situations when the system is about to go down, and data must be stored and operations must be performed in order to save crucial system data. It is therefore critical to increase the likelihood that these data packets reach their destination and are not discarded, for their loss could cause irreparable damage to the system.

Network designs have dealt with this situation in various ways. Typical network adapters process received data packets on a first come first served basis. If the resources at the adapter cannot handle additional data packets, the packet is discarded. These systems may not use the entire network packet carrying capacity in order to maintain reliability.

When a node on a network cannot receive new data packets, the network becomes congested. Congestion algorithms have been implemented to increase transmission reliability by monitoring system traffic and adjusting data transmission to a desired rate. This has been achieved by flagging the sender that the receiver has reached capacity and further transmission should not be initiated. Unfortunately, the flagging mechanism requires transmitting a packet into a congested network, and therefore the packet may be lost due to lack of network resources.

Another method of increasing data transmission reliability is to allocate buffer memory at the receive adapter to store incoming packets before they are passed onto the receive host. The addition of adapter buffer memory allows receipt of incoming data packets while the host is engaged in processing an earlier packet. However, there remains the issue of what happens to incoming data packets when the receive adapter handling capacity has been reached and there is no more available storage capacity in the adapter buffer memory. Sufficient adapter buffer memory to handle all incoming packet rates increases cost by adding memory capacity and increasing hardware complexity. In addition, it does not fully utilize the reliability advantage of the transmission systems employing automatic retry mechanisms.

It would be desirable to have a network adapter which could operate at the maximum network bandwidth while guaranteeing delivery of a minimum number of maintenance operations protocol or station management packets even during times of major congestion.

SUMMARY OF THE INVENTION

In accordance with the principles of the present invention there is provided an improved method and apparatus for memory management in a packet-switched network adapter to reduce packet loss. Apparatus embodying the present invention may advantageously include parsing hardware for determining packet type, five allocations of buffers and a hardware flag for indicating available buffer capacity.

As a serial data packet is received over the network, it is stored in longword format in a temporary buffer. The stored bits of the packet are scanned and interpreted by the parsing hardware which generates a forwarding vector. The forwarding vector identifies various characteristics about the incoming packet, including the packet type.

Two distinct packet types are host destined packets and adapter manager destined packets. The host destined packets include both data packets and command packets that are going directly to the host. The adapter manager destined packets include commands that may ultimately be transmitted to the host but initially may require processing by an adapter manager. There are four types of packets processed by the adapter manager; station management packets, maintenance operations protocol (MOP) packets, XID/Test packets, and error packets. Station management packets include command packets for monitoring the number of tokens in the token ring network. MOP packets include command packets for monitoring the status of each node, for example how many packets have been discarded. XID/Test packets include commands for obtaining the host node identification address, as well as test commands for verifying network connectivity. Error packets include packets which either were not received in their entirety, or were received with parity errors.

The five allocations of buffers can be categorized as temporary buffer allocation, host buffer allocation, general purpose adapter manager (GPAM) buffer allocation, station management buffer allocation, and maintenance operations protocol (MOP) buffer allocation. The temporary buffer allocation stores all incoming packet data while the data is being parsed by the parsing hardware. The host buffer allocation comprises of a number of buffers for storing only host data or host command packets. The GPAM buffer allocation comprises of a number of buffers for storing all four types of packets processed by the adapter manager. The station management buffer allocation comprises of a number of buffers to store only station management packets. Likewise, the MOP buffer allocation comprises of a number of buffers to store only MOP packets.

After the parsing hardware determines the packet type, the packet is transferred from the temporary buffer to its' appropriate buffer. A host packet is stored in a host buffer if the host buffer has sufficient remaining memory to store the incoming packet. If the host buffer allocation does not have sufficient memory to store the packet, the packet is discarded. Counters are maintained in the adapter manager which monitor the number and type of discarded packets. Discarding host packets is not detrimental to system reliability, because the transmission of discarded host packets will automatically be retried.

An adapter manager packet is stored in the GPAM buffer, unless a flag indicates that there is insufficient space remaining in the GPAM buffers to store the packet. In that event, if the packet is a MOP packet, then it is stored in a MOP overflow buffer. If there is insufficient space remaining in the GPAM buffer to store the packet, and it is a station management packet, then the station management packet is stored in a station management overflow buffer. If the packet is an error type packet or an XID/test packet and there is insufficient space remaining in GPAM buffers for storage of the packet, the error packet or XID/test packet is discarded and the discard count is incremented.

Memory management apparatus embodying the invention thus provides added margins of reliability for the receipt of vital maintenance operations protocol and station management packets in the event of a highly congested system which otherwise would typically be forced to discard the station management and maintenance operations protocol packets.

DESCRIPTION OF THE PREFERRED EMBODIMENT

Figures 1, 5:
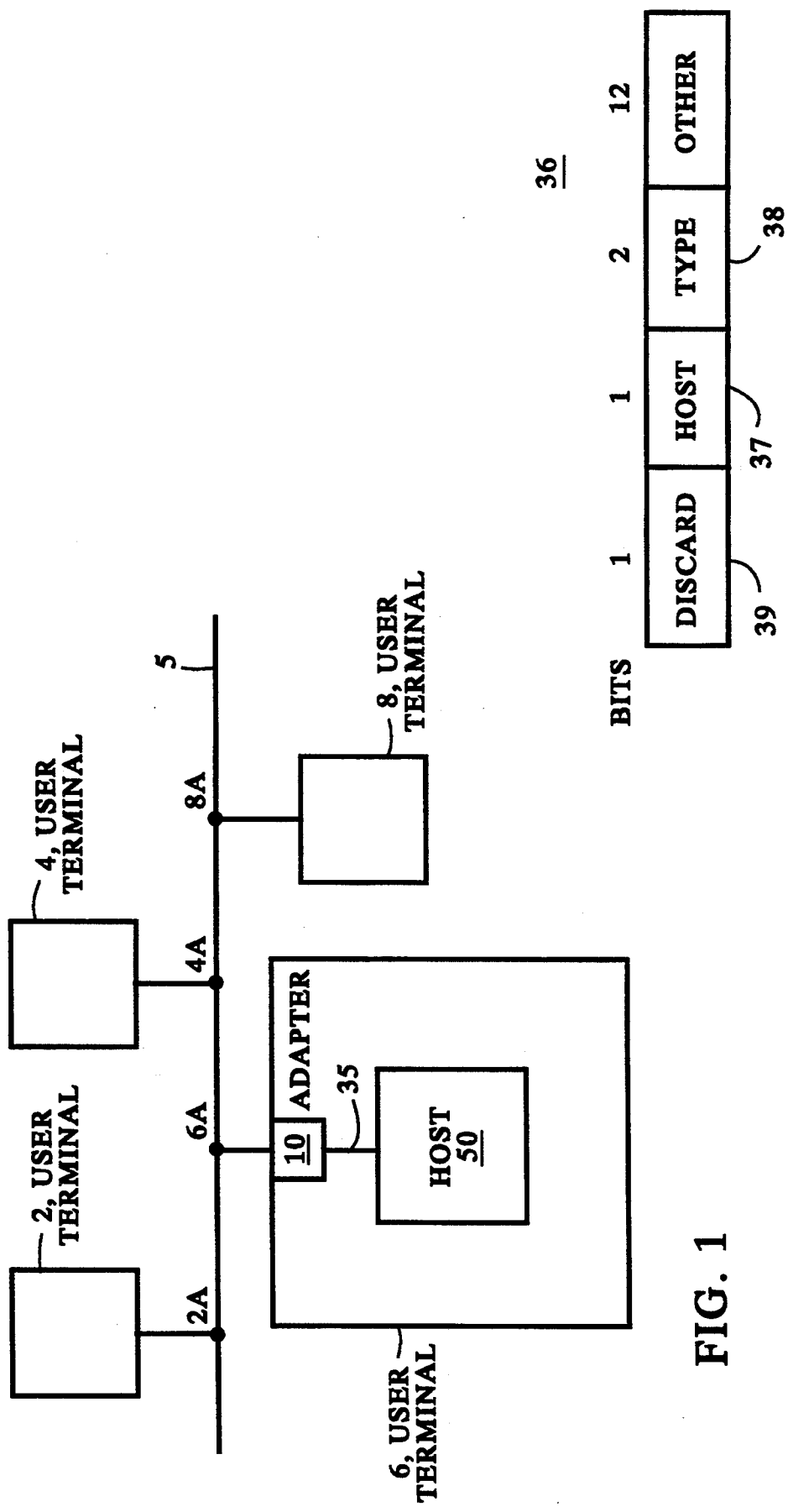
FIG. 1 illustrates part of a typical data transmission network configuration, with an exploded diagram of a user terminal node.
FIG. 5 shows the layout of the forwarding vector used in the embodiment of the invention.

Referring now to the drawings, FIG. 1 depicts part of a token ring packet-switched local area network (LAN) having a high speed data transmission line 5 connected to user terminals such as 2,4,6 and 8 at node such as 2A, 4A, 6A and 8A. The transmission line preferably comprises an optical fibre line; suitable alternatives include EthernetTM. The LAN utilizes a layered architecture, in the system being described a DNA architecture described in more detail in Chapter 7 of "ISDN, DECnetTM, and SNA Communications", referenced above and incorporated herein by reference. In a layered architecture, various system resources are divided into layers each providing its own resource management. Two of the layers, the Physical Link Layer and the Data Link Layer are directly concerned with transmission of data over the transmission line 5. The Physical Link Layer is concerned with the transmission of bits over the transmission line. The task of the Data Link Layer is to take bits received from the Physical Link Layer and transform them into packets for delivery to the network layer. Data is transmitted serially over the data line 5 in the form of packets conforming to the specifications of the particular switching system. Each packet comprises a block of data together with a header and trailer containing the information required for processing and delivering the packet to its intended destination.

Each of the user terminals 2,4,6, and 8 includes a host device 50 and an adapter 10 which provides an interface between the host 50 and a node of the transmission line 5. Data packets are received serially from the transmission line 5 by an adapter 10 which determines whether or not a received packet is intended for its associated host 50. If, for example, a data packet received and stored by the adapter 10 attached to the node 6a is intended for the user terminal 6, the data packet is transmitted in parallel format over a parallel bus 35 to the host of the user terminal 6.

Figure 2:
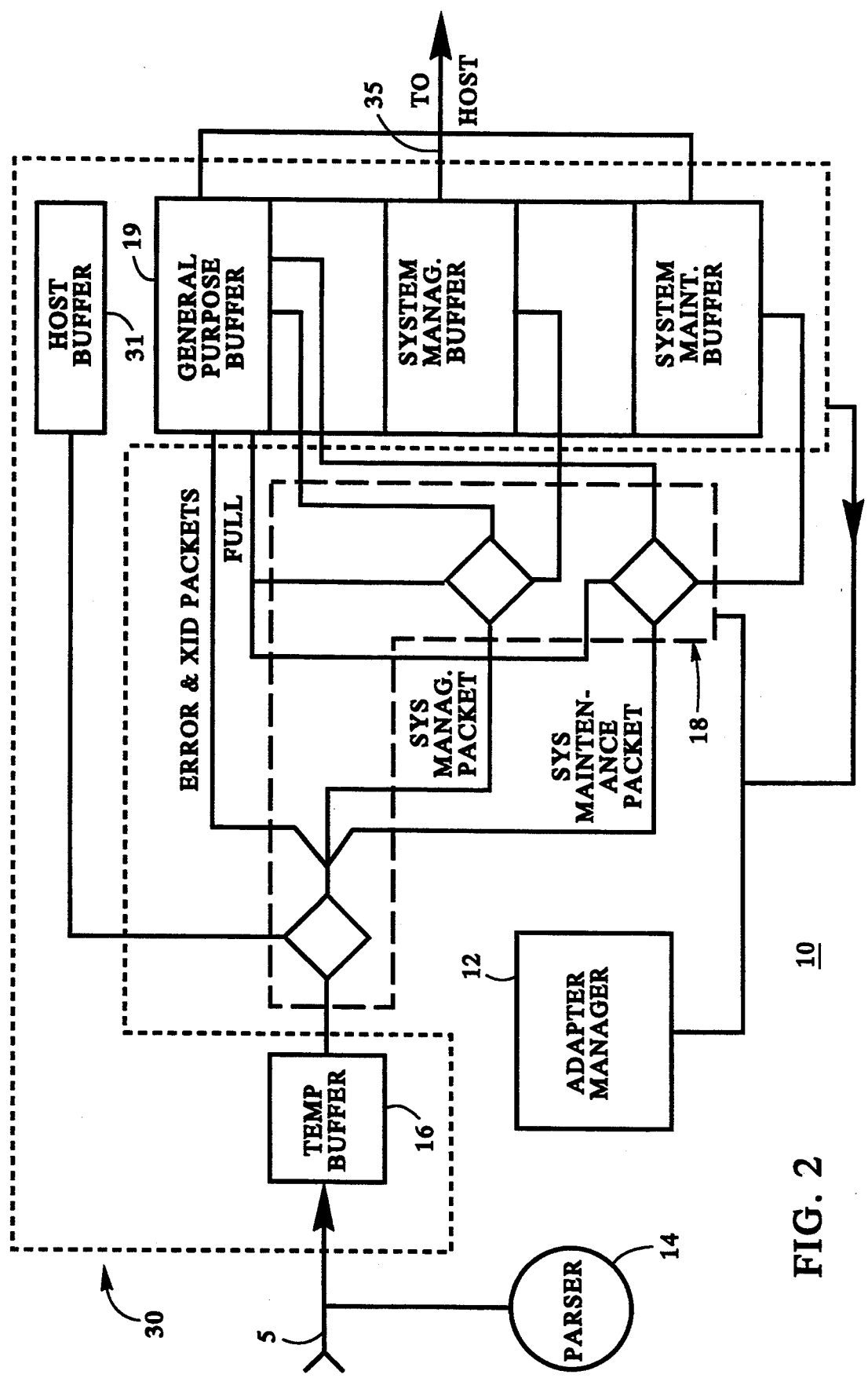
FIG. 2 is a high level block diagram of an adapter illustrating its memory organization.

FIG. 2 shows an adapter 10 in functional block form. The adapter 10 includes an adapter manager 12; a packet buffer memory 30 (outlined in dashed lines); arbitration hardware 18 (outlined in dotted lines) and parsing hardware 14. The adapter manager 12 comprises a central processing unit such as Motorola's MC68020 32 bit microprocessor which processes XID/Test, maintenance operations protocol and station management commands. The adapter manager 12 may also communicate MOP or station management information to the host 50. The packet buffer memory 30 consists of a number of random access memory (RAM) chips, having space within the packet buffer memory 30 allocated to temporary buffer memory 16, adapter manager buffer memory 19 or host buffer memory 31.

Data packets, received serially over the LAN 5, are stored in a buffer of the temporary buffer memory 16 and parsed by the parsing hardware 14 of that adapter. If the packet is identified by the parser 14 as intended for that particular user terminal, it is routed by the arbitration manager 18 either to the adapter manager buffer memory 19 or the host buffer memory 30, dependent on whether the destination of that packet is the adapter manager 12 or the host 50.

Figure 3:
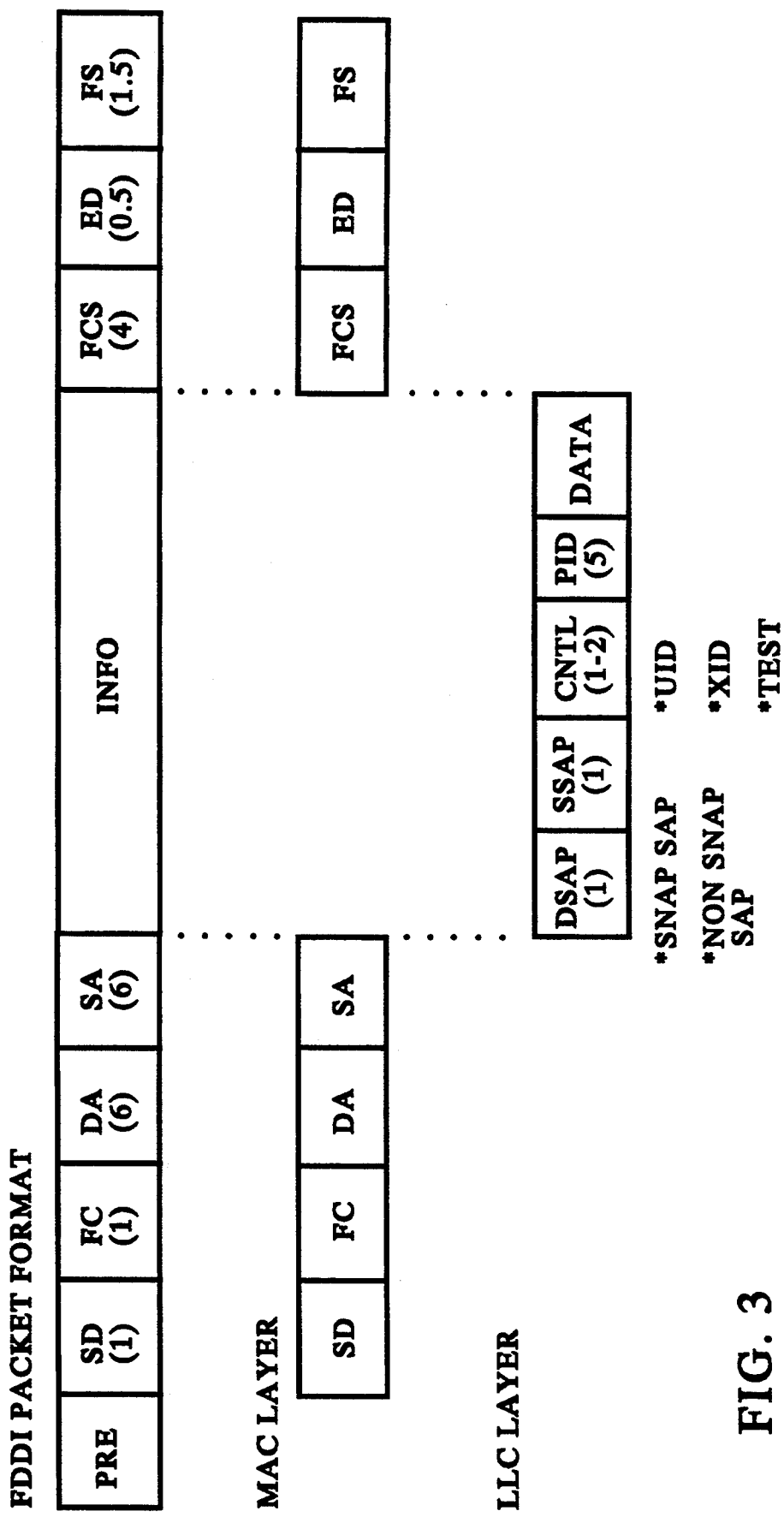
FIG. 3 shows the field layout of a typical LAN packet.

The Data Link Layer associated with packet transmission over the network, referred to above, is further subdivided into a Medium Access Control (MAC) layer and a Logical Link Control (LLC) layer. The FDDI is described in greater detail in chapter 5 of "Computer Networks, 2nd ed." by Tanenbaum (Prentice Hall, 1988). FIG. 3 shows a Fibre Digital Data Interface (FDDI) packet format, including MAC layer and LLC layer data fields, employed in this embodiment of the invention. The MAC layer field comprise SD, FC, DA, SA, FCS, ED and FS fields. The LLC layer fields comprise DSAP, SSAP, CNTL, PID and DATA fields. The width, in bytes of each field is indicated in parentheses in the depiction of the FDDI packet format shown in FIG. 3. Data contained in the fields of the FDDI packet format provide various functions as described below.

The Preamble (PRE) field contains a string of bits which indicates that a packet is about to arrive. In the MAC layer fields, the Start Delimiter (SD) field data signals the start of the packet and the Function Code (FC) field data is used to identify the packet type. The FC field is one byte wide. The two most significant bits differentiate between MAC and LLC, while the remaining six bits are used to further define the type of the incoming MAC or LLC packet. Station management packets are types of MAC packets.

The Destination Address (DA) data field identifies the destination node(s) to receive the packet and the Source Address (SA) data field identifies the node from which the packet was transmitted. The PRE, SD,FC,DA and SA fields comprise the MAC header portion of the packet. The trailer of the packet includes a Frame Check Sequence (FCS) field for data used to perform a cyclic redundancy code (CRC) test; Ending Delimiter (ED) field for data signifying the end of the packet; and a Frame Status (FS) field which indicates whether the receive node recognized the address of the packet as one of its own and whether or not the receive node copied the packet into one of its buffers. The FS field indicates to the transmitter of the packet that either the destination node is non-existent/non-active on the network; the destination node exists but it didn't copy the packet; or the destination node exists and it copied the packet.

Using data extracted only from the MAC layer fields, an adapter can determine if a packet is a station management packet to be handled by the adapter manager 12. However, the adapter manager 12 handles four types of packets, the remaining three of which cannot be identified solely from information contained in the MAC layer fields of a packet. The additional information needed for identification of such packets is included in the LLC layer fields. The LLC layer fields also include a Destination Service Access Point (DSAP) field and Source Service Access Point (SSAP) field which identify the communicating services in the source and destination nodes to which the LLC information field (DATA) should be applied.

The XID/Test packets, which are processed by the adapter manager 12, are identified by decoding the data in the Control (CNTRL) field of the LLC. The Protocol Identifier (PID) field is only present when the DSAP field and the SSAP field both contain a value of AA hex, and the decoded value of the CNTL field is UI (unnumbered identifier). A MOP packet type requires the above field values to be present, along with a PID decode indicating that the packet is a Maintenance Operations Protocol (MOP) packet. The MOP packet is also processed by the adapter manager 12. The DATA field contains either a command or data for the host 50 or the adapter manager 12.

Along with station management, XID/Test and MOP packets, flagged error packets are also processed by the adapter manager. The adapter manager 12 counts received error packets and transfers the count to the host 50 of that adapter 10 upon request. For example, an error is flagged in respect of a received packet when the CRC of the packet does not match the value in the FCS field.

Figure 4:
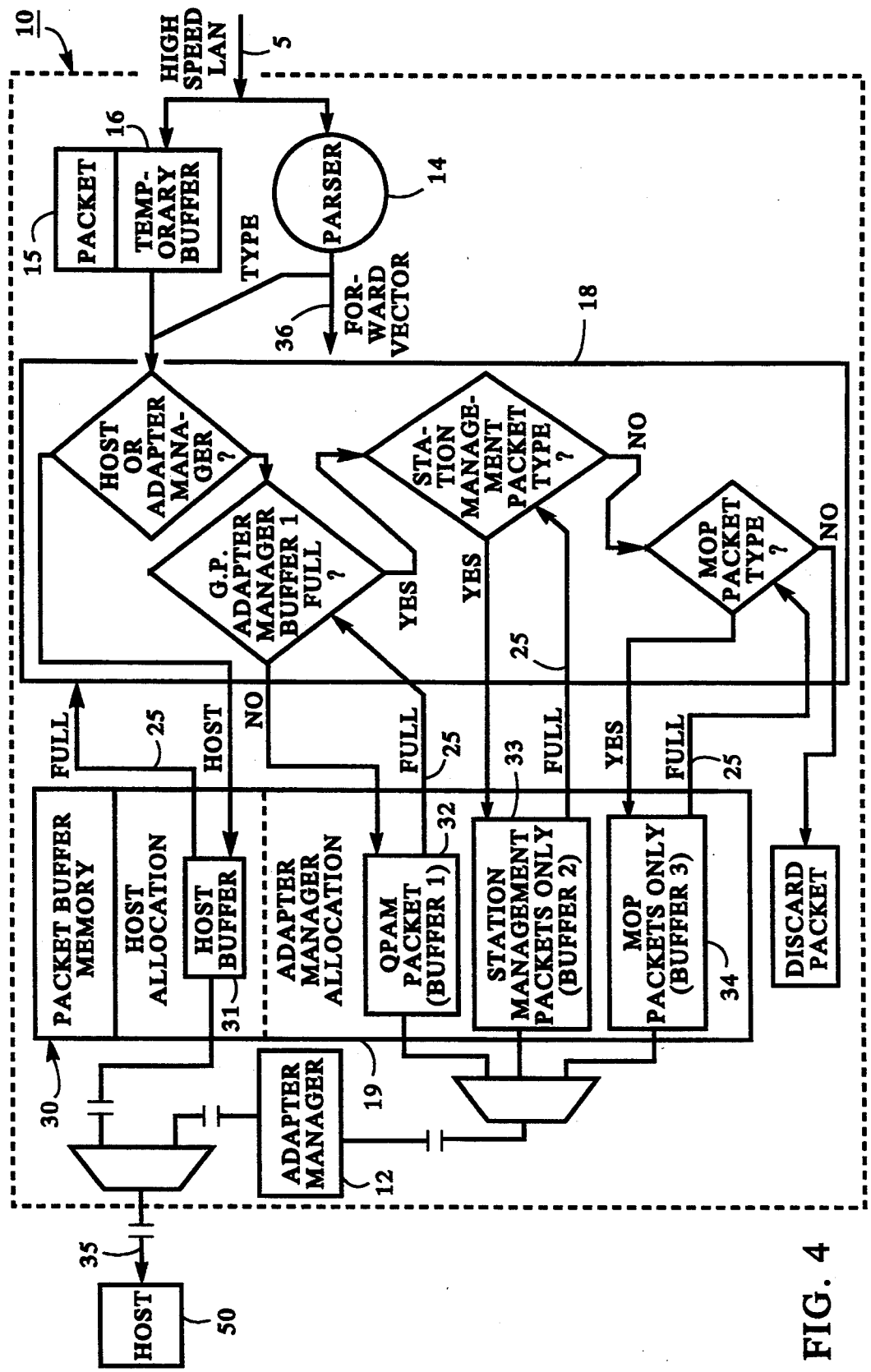
FIG. 4 is a detailed block diagram of an adapter and its memory organization.

FIG. 4 is a block diagram showing the hardware elements in an adapter device 10. The data transmission line 5 is connected to a parsing hardware 14 and a temporary buffer 16. The parsing hardware 14 feeds arbitration hardware 18 with packet type identification information obtained by parsing the MAC and LLC layer fields of the packet 15. This packet type information differentiates between host packets (containing information destined for the host 50 of that adapter 10), station management packets, XID/Test packets, MOP packets, error packets and discard packets. The type information is received by the arbitration hardware 18 from the parser 14 in a field of a forwarding vector 36 (to be described later). The arbitration hardware also receives a buffer descriptor field which provides size information.

The arbitration hardware 18 additionally receives status in the form of a status vector 25 from packet buffer memory 30, which indicates the amount of buffers which are available to receive incoming packets. As previously described, packet buffer memory 30 has temporary buffer 16, host buffer 31 and adapter manager buffer 19 allocations. The adapter manager buffer allocation 19 is further subdivided into a general purpose adapter manager (GPAM) buffer 32, a station management buffer 33, and a MOP buffer 34. Each buffer is allotted space within the packet buffer memory 30 upon initialization of the adapter 10. The space is allocated by giving each allocation a certain number of fixed sized pages of memory. A counter is maintained to monitor how many of the fixed sized pages are available to write incoming data. When all of the fixed size pages allocated to the buffer contain current data, the buffer is no longer able to receive incoming packets. The status vector 25 from the packet buffer memory 30 provides indications to the arbitration hardware 18 that there is no space to write the destination buffer with the next packet.

The arbitration hardware 18 controls the transfer of data bits from the temporary buffer 16 to one of the other four packet buffer memory allocations, namely; host buffer 31, general purpose adapter manager buffer (GPAM) 32, station management buffer 33 or MOP buffer 34. When the host 50 is free to receive an information packet 15, the packet 15 is transmitted in parallel from its host buffer memory allocation 31 to the host 50 over the host parallel bus 35.

The arbitration hardware 18 determines the storage of the packet 15 in the correct buffer through the following process. As the data bits flow in serially over the high speed LAN input bus 5, they are parsed by the parsing hardware 14 and at the same time stored in a temporary buffer 16. The temporary buffer 16 is large enough to allow real time serial transfer from the high speed LAN input bus 16 to the adapter 10 without losing data bits. The parsing hardware 14 reads the input string and determines the start of a received packet 15, the end of the packet, and the type of the packet 15 from the MAC and LLC fields of that packet. Utilizing this information and other information garnered from the input bit string, such as the Source Address, Destination Address, DSAP, SSAP, and length from the LLC DATA field, the parsing hardware 14 generates a forwarding vector 36, the format of which is shown in FIG. 5.

The forwarding vector 36 contains three fields of particular importance to this invention; the discard field 39, the host field 37 and the type field 38. The discard field 39 is a one bit field which is set if the parsing hardware 14 has determined that the packet is not for this user terminal. The host field 37 is a one bit field which indicates whether the received packet 38 is destined only for the host 50 (a host type packet) or whether the adapter manager 12 must process the packet 15 (an adapter manager type packet). The type field 38 is a two bit field and is only relevant when the host field 37 indicates an adapter manager type packet. The type field 38 differentiates four types of adapter manager type packets; error packets, MOP packets, XID/test packets, and station management packets.

Referring again to FIG. 4, the arbitration hardware 18 receives type information from the forwarding vector 36, and combines this information with the status vector 25 from packet buffer memory 30. The status vector 25 contains information about the remaining pages for each buffer allocation within packet buffer memory 30, and indicates when there is not enough space within a particular buffer allocation to store a packet 15. By combining the status vector 25 with the information in the forwarding vector 36 associated with a particular received packet stored in the temporary buffer 16, the arbitration hardware 18 is able to determine in which buffer of packet buffer memory the received packet 15 should be stored.

The basic flow of the arbitration hardware 18 is outlined in FIG. 4. Initially, the discard bit 39 of the forwarding vector 36 is examined. If the discard bit 39 is asserted, the packet is discarded. If the discard bit 39 is not set, the arbitration hardware 18 differentiates between a host type packet and an adapter manager type packet by analyzing the contents of the host field 37 in the forwarding vector 36.

If the packet 15 is destined for the host 50 and if the field of the status vector 25 associated with the host buffer 31 indicates that there is sufficient allocation available, the packet is stored in a host buffer 31. If there is insufficient allocation available in host buffer 31, the packet 15 is discarded. If no acknowledgement is received from the host 50 by transmitting node for the discarded packet, the transmitter resends the packet 15, and this pattern continues until the packet 15 reaches the host 50.

If the packet 15 is destined for the adapter manager 12, then the arbitration hardware 18 has the option of placing the message in one of three buffer allocations within adapter manager allocation 19, i.e. the general purpose adapter manager (GPAM) buffer 32, the station management buffer 33, or the MOP buffer 34. The arbitration hardware 18 initially responds to the field of the status vector 25 associated with the general purpose adapter manager buffer 32. If there is sufficient allocation in that buffer 32 to store the packet 15, it is stored in the GPAM buffer 32 regardless of the particular type of adapter manager packet (error, XID/Test, station management, MOP). However, if the GPAM buffer 32 does not have a sufficient number of remaining memory allocations available to store the packet, the arbitration hardware 18 must further decide whether to discard the packet 15 or to store it in one of the dedicated overflow buffers (the station management buffer 33 or MOP buffer 34). This determination is again made in response to the type field 38 of the forwarding vector 36.

If the GPAM buffer 32 does not have sufficient remaining memory locations to store the packet, and the packet 15 is a station management type packet, it is stored in the station management overflow buffer 33. Likewise, if the general purpose adapter manager buffer 32 does not have sufficient remaining memory locations to store the packet, and the packet 15 is a MOP type packet, it is stored in the MOP overflow buffer 34. If the general purpose adapter manager buffer 32 does not have sufficient remaining memory locations to store the packet, and the packet 15 is an error packet or an XID/test packet, the packet is discarded, and the discard count for that packet type is incremented.

It should be stressed that the MOP buffer 34 and station management buffer 33 will only be used when the general purpose adapter manager buffer 32 is full. The purpose of these two buffers is to provide overflow memory capacity to reduce the possibility that critical station management packets and MOP packets are discarded in a congested network. The size of the overflow buffers is determined at adapter initialization. However, if the discard packet count for a MOP or station management packet indicates that a large number of packets has been dropped, the system can be brought down and the allocation amounts can be increased.

Due to the latency involved in writing memory, it is desirable to minimize memory writes. The utilization of a ring data structure in the preferred embodiment facilitates communication between the packet buffer memory 30, the host 50, and the adapter manager 31.

Figure 6:
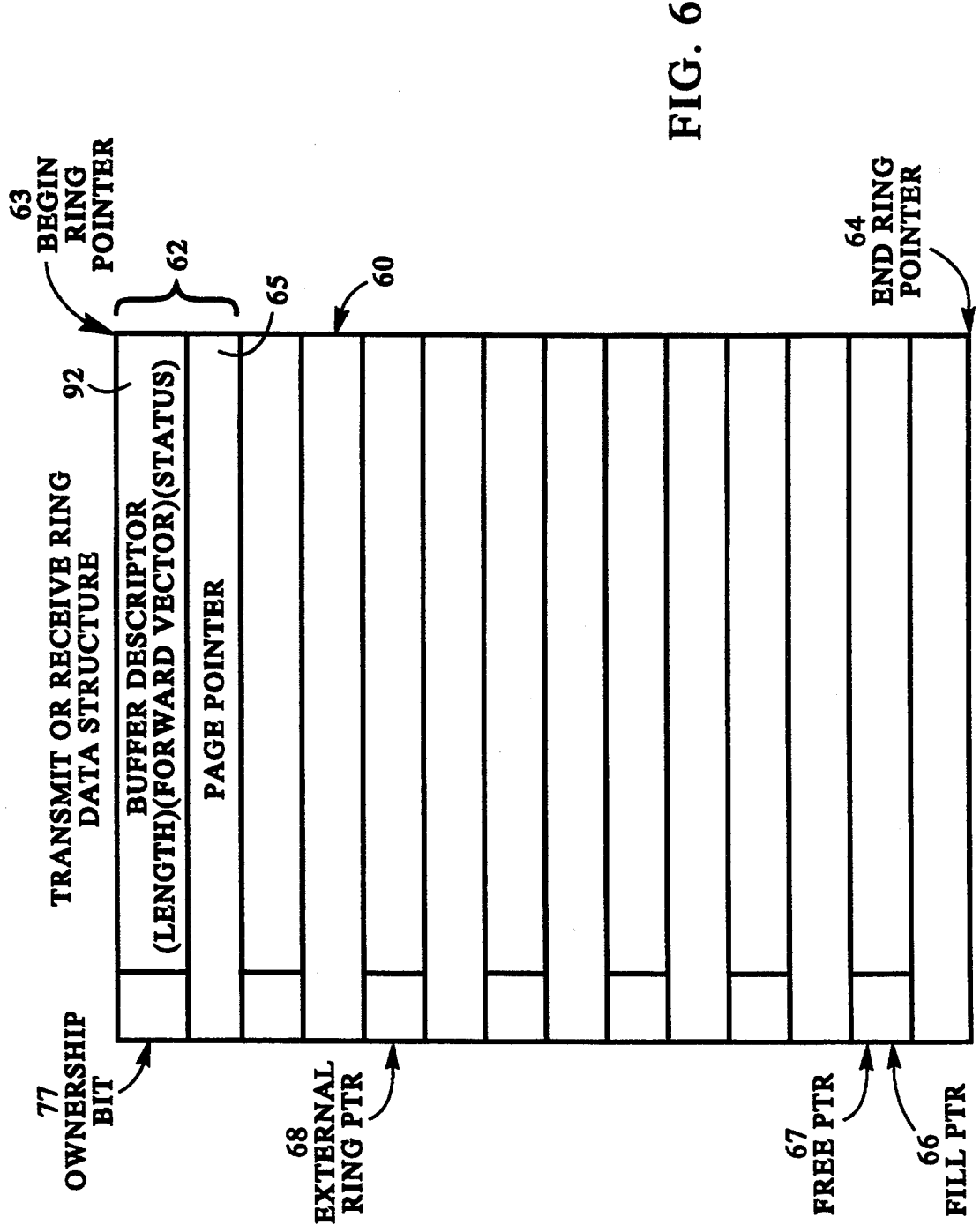
FIG. 6 shows a ring data structure that is used in the preferred embodiment of this invention.

Ring data structure implementation requires a set of consecutive memory addresses, as shown in FIG. 6. The ring begin pointer 63 and the ring end pointer 64 define the beginning and end of a ring 60. Rings are divided into ring entries 62 each comprising several bytes; the number of bytes in an entry is an integral multiple of longwords. The entry size and number of entries in a ring determine the ring size. Each ring entry 62 consists of: an ownership bit 77, which indicates whether the transmitter interface or the receiver interface owns the entry; page pointers 65, which point to transmitted or received pages in packet buffer memory; a buffer descriptor 92, which contains the length (number of bytes) of the packet in packet buffer memory 30, the forwarding vector associated with the packet, and status and error fields associated with the packet.

Two entities, the transmitter and the receiver, interface with a ring 60 to exchange data. The receive and transmit interface exchange entries by toggling the ownership bit 77 of the ring entry 62. The unit of data exchanged between the transmitter and the receiver interface is a packet. A packet may be written on a single page (utilizing a single ring entry 62) if the packet is small or over multiple pages (utilizing multiple ring entries) if the packet is large. A two bit wide field in the forwarding vector 36 of each ring entry 62 is used to designate the beginning and end of the packet. These bits are called the start of a packet (SOP) and the end of a packet (EOP). Thus, for a one page packet both the SOP and EOP in the forwarding vector of the ring entry 62 are asserted. For a multiple page packet, the ring entry 62 associated with the first page has the SOP asserted, the ring entries associated with the middle pages have both the SOP and EOP deasserted, and the ring entry associated with the last page has the EOP asserted.

In addition to the ring begin pointer 63 and the ring end pointer 64, there is also a FILL pointer 66 and a FREE pointer 67 associated with each ring. The FILL pointer 66 designates a ring entry whose page pointer points to data which is ready for transfer to another ring, and the FREE pointer designates the first free ring entry 62 in the ring 60. Since two rings are communicating, there is also an external pointer 68 to a ring which is controlled by the interfacing ring. The external pointer 68 indicates the progress that the interface is making in processing the ring data.

Figure 7:
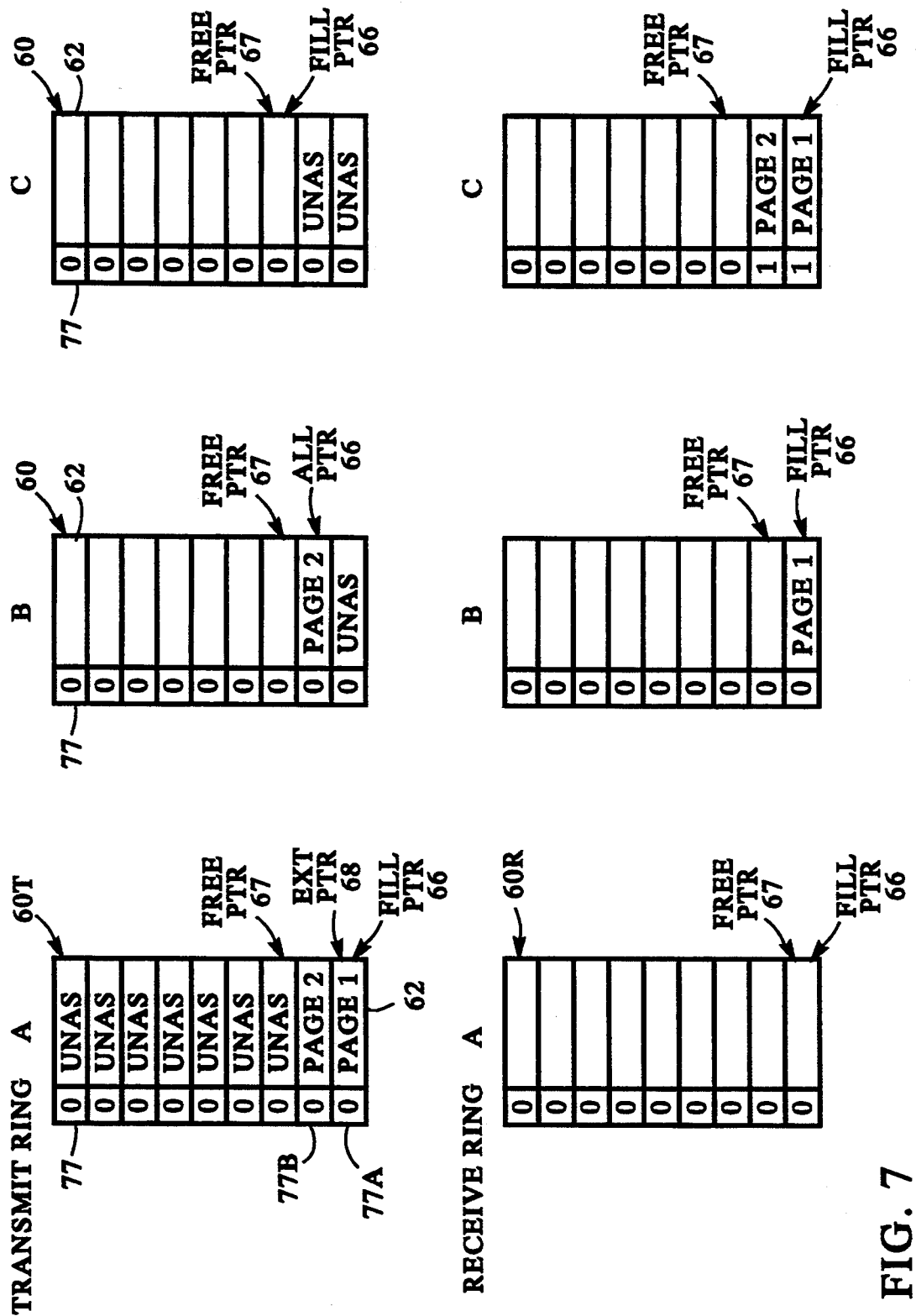
FIG. 7 shows an example of a transfer of page pointers between rings.

The movement of pages between rings is accomplished as follows and as diagramed in FIG. 7. When one ring 60 has data to transmit to another, it toggles the ownership bit 77 of the ring entry. Thus, in FIG. 7, the transmitting ring 60 has flipped ownership bits 77a and 77b to a 0 to initiate the exchange of data with the receiving ring 60r. The receiving ring 60r examines the ring entry 62 in the transmitting ring 60 pointed to by its external pointer 68. If the ownership bit 77a indicates to the receiving ring 60r that the latter now owns the entry, the receive ring 60r copies the ring entry data 62 (including the page pointer 65 and the buffer descriptor 92) over to the ring entry pointed to by the receive ring 60r FREE pointer. The effect of this transaction is shown in steps B and C of FIG. 7. After the receive ring 60r copies all of the ring entries comprising the packet, it toggles the ownership bits for each ring entry which received new data, to indicate that the receive ring controls the data pointed to by the page pointers in the ring entries. This step is evidenced in step C of FIG. 7. After the receive ring has finished processing the packet, it will again toggle the ownership bit. The transmit ring detects the toggle of the ownership bit, and reclaims the page pointed to by the page pointer by copying the page pointer into its ring.

There is both a transmit ring and a receive ring for the temporary buffer 16, host buffer 31, and adapter manager 19 buffer allocations, providing a total of six rings in the preferred embodiment of the invention. The receive rings receive packets from external interfaces, such as the host 50, the transmission line 5, or the adapter manager 12. The transmit rings transmit packets to the external interfaces.

Figure 8:
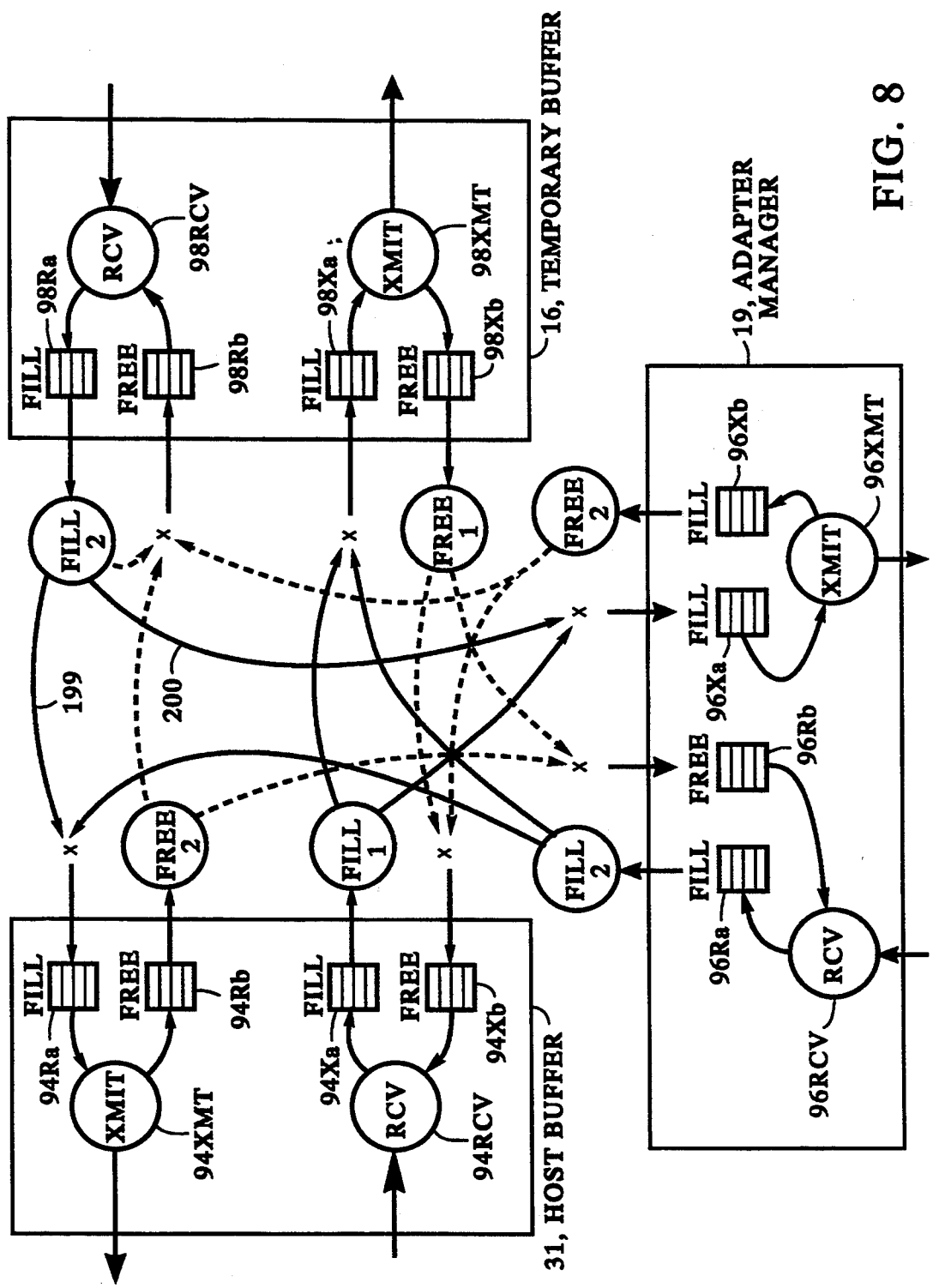
FIG. 8 is a high level block diagram of the memory management subsystem of this preferred embodiment utilizing the ring data structure.

Communication between the rings is shown in FIG. 8. The receive ring 98rcv of the temporary buffer 16 receives the packets from the network. The transmit ring 94xmt of the host buffer 31 and the transmit ring 96xmt of the adapter manager buffer 19 receive packets that are to be transmitted to the host and to the adapter manager. The arbitration mechanism between the temporary receive ring 98rcv, the adapter manager transmit ring 96xmt and the host transmit ring 94xmt is the focus of this embodiment of the invention.

Figure 9:
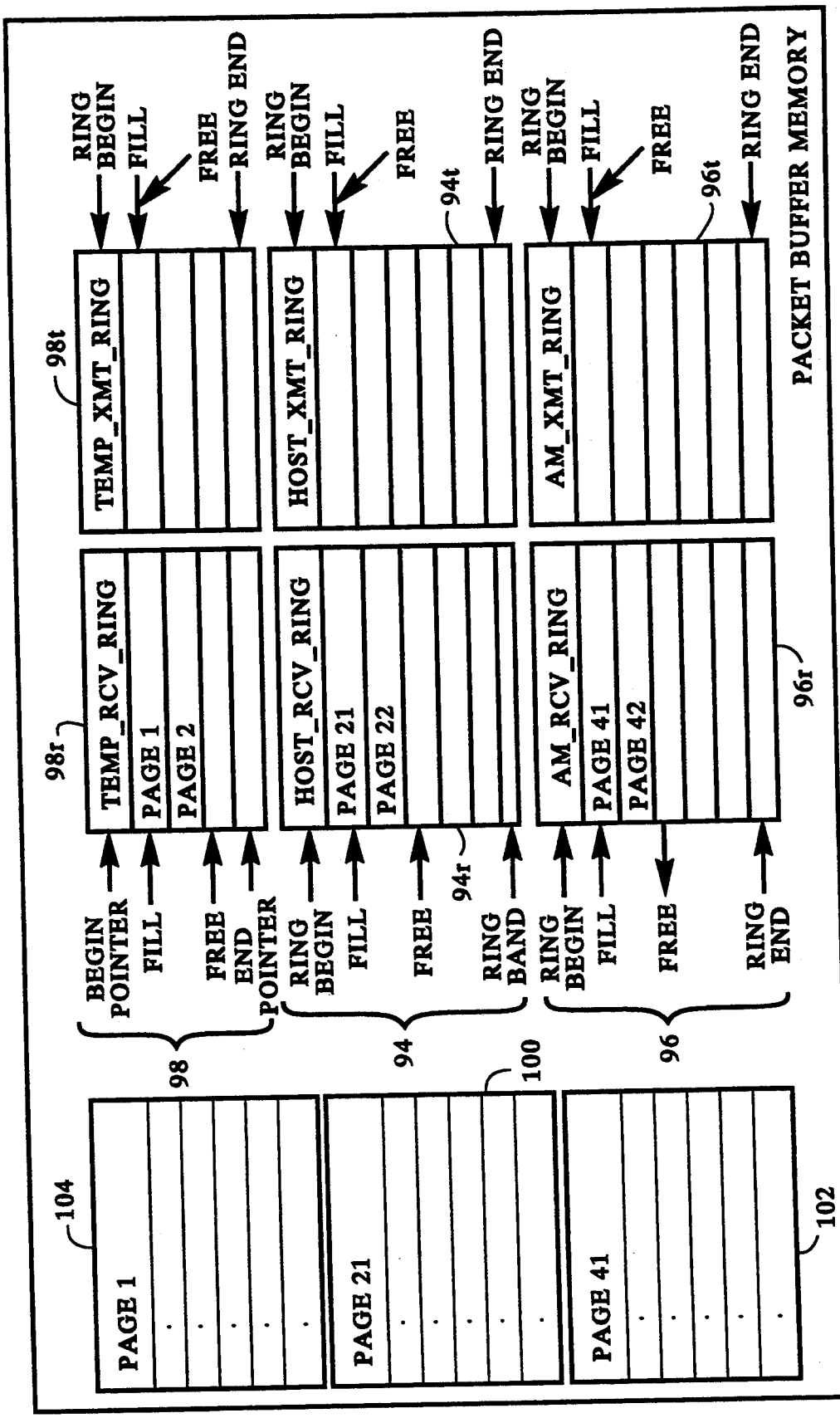
FIG. 9 shows the packet buffer memory layout at initialization.

As mentioned previously, the FREE ring entries of each ring are available ring locations for receiving ring entries from other rings. The fill ring entries indicate used entries of the ring. Each of the Host Buffer 31 receive and transmit rings (94RCV and 94XMT, respectively) are shown to include buffers of FILL ring entries, 94Xa and 94Ra, and buffers of FREE ring entries, 94Xb and 94Rb. Each of the Adapter Manager 19 receive and transmit rings (96RCV and 96XMT, respectively) are shown to include buffers of FILL ring entries, 96Xa and 96Ra, and buffers of FREE ring entries, 96Xb and 96Rb. In addition, each of the Temporary Buffer 16 receive and transmit rings (98RCV and 98XMT, respectively) are shown to include buffers of FILL ring entries, 98Xa and 98Ra, and buffers of FREE ring entries, 98Xb and 98Rb. A layout of packet buffer memory 30 at adapter initialization is shown in FIG. 9, where each block represents a block of memory space. At adapter initialization, there is a fixed address for the ring begin pointers and ring end pointers of the host ring 94, the adapter manager ring 96 and the temporary ring 98. The first FILL ring entry contains a page pointer which designates the first page of the associated buffer allocation. For example, the first FILL ring entry of the host receive ring 94r entry designates the first page of the host allocation 100. Likewise, the first FILL ring entry of the adapter manager receive ring 96r entry designates the first page of the general purpose adapter manager allocation 102, and the first FILL ring entry of the temporary receive ring 98r entry contains the page pointer of the first page of the temporary buffer allocation 104.

Associated with each ring is a group of counters. The counters are pointers to the rings. When a packet is received, the size of the packet determines how many physical pages, and consequently ring entries, are needed to store that packet. For example, when a packet is received over the network, it is placed at the physical page number of the ring entry designated by the temporary receive ring FREE pointer. If the packet is larger than one page, the counter is incremented by the number of pages utilized by the packet. After the entire packet has been placed in packet buffer memory 30, and the corresponding forwarding vector 36 has been copied to each ring entry 62 with the appropriate SOP bits and EOP bits set, each utilized ring entry ownership bit 77 in the temporary receive ring 98r is toggled to indicate that it is ready to be transferred to a designated ring.

Before a packet can be transferred to the designated ring, however, it must be verified that there is sufficient allocation to store the packet. In addition to the counters 115 which address the rings, there are also a group of counters which monitors the contents of the host buffer 31, the general purpose adapter manager (GPAM) buffer 32, the MOP buffer 34 and the station management 33. Each buffer is assigned a memory allocation amount indicating the maximum number of pages of the packet buffer memory 30 that each packet type is allowed to use. As previously described, the GPAM buffer 32 stores MOP packets 34, station management packets 33, error packets and XID/Test packets. MOP buffer 34 and station management buffer 33 provide overflow allocations to permit station management packets and/or MOP packets, critical to proper network operation to continue to be received from the network even when the GPAM 32 has used up its allocated amount of pages.

When a packet is received over the network, and is destined for the host transmit ring 94xmt or the adapter manager transmit ring 96xmt, the remaining allocation amount for either the host or adapter manager is compared against the number of pages storing the packet. If the packet is received in the temporary buffer receive ring 98rcv, and there are not enough pages remaining in the allocation amount for that packet type to store the packet, the packet is discarded. However, the addition of a separate overflow allocation amount for station management packets and MOP packets effectively reduces the possibility that vital system packets would be discarded, thus increasing system reliability.

Figure 10:
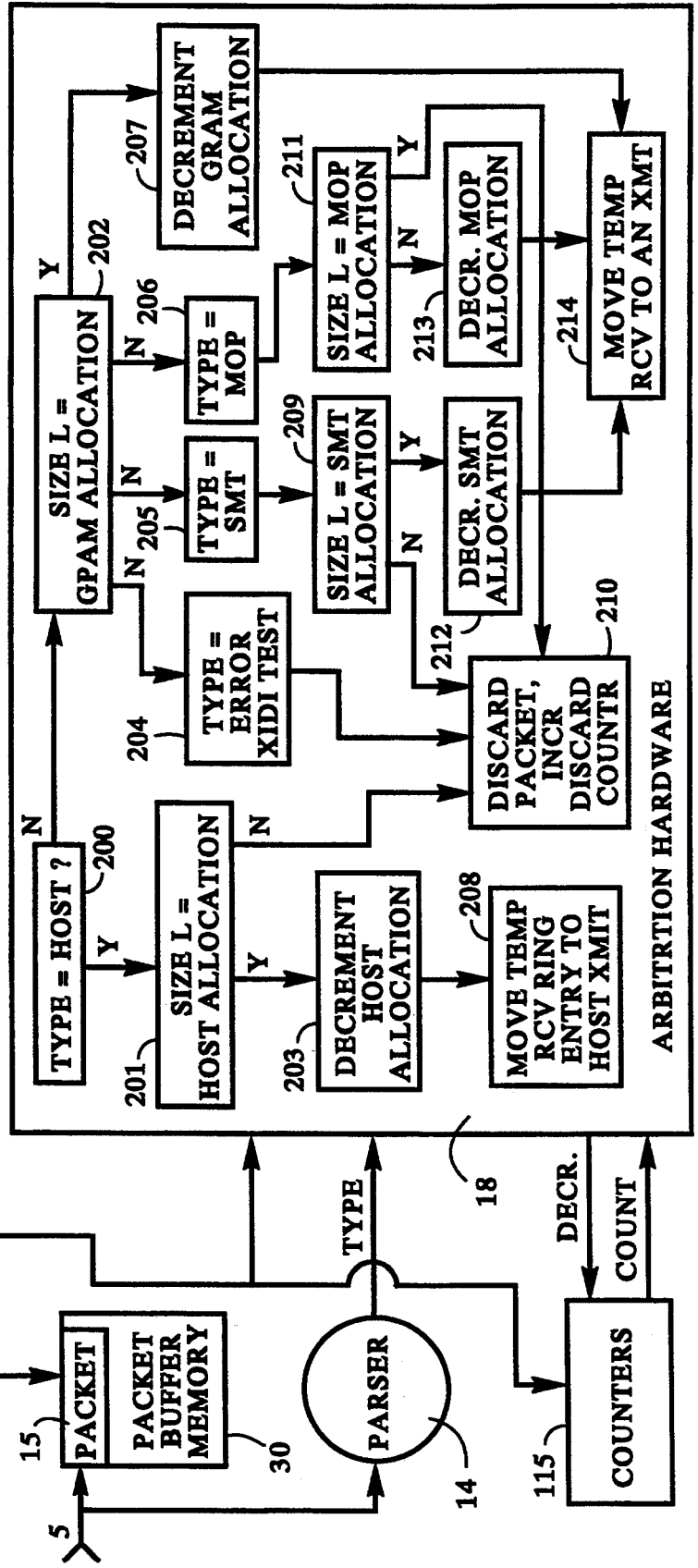
FIG. 10 is a block diagram of an adapter used in a preferred embodiment of the invention in which the three rings used in a preferred embodiment of the invention are shown.
Figure 11:
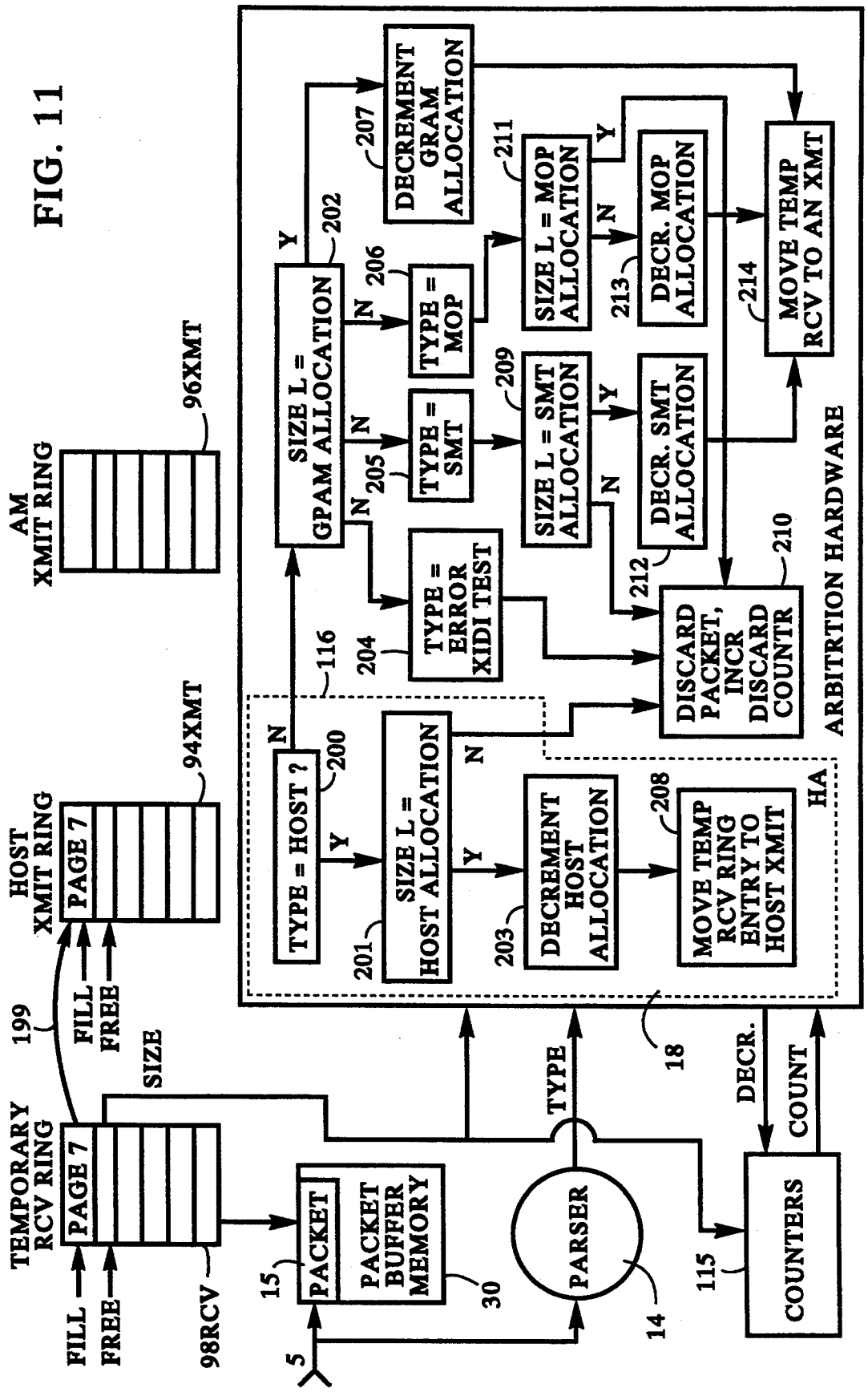
FIG. 11 is a block diagram showing the transfer of a packet pointer from the temporary buffer ring to the host buffer ring.

The utilization of rings in the preferred embodiment of this invention is shown in FIG. 10 . A packet 15 is received from a high speed serial LAN 5, and stored in packet buffer memory 30 at the location pointed to by the current ring entry of the temporary receive ring 98r. At step 200 the type field of the forwarding vector is determined by the parsing hardware 14, and fed to the arbitration hardware 18. At steps 201 and 202, the size of the packet 15 from the buffer descriptor field 92 (FIG. 6) of the current ring entry is compared with the remaining allocation for the packet type. If it is a host type packet, and the host allocation amount is greater than the packet size, at step 203 the counter of 115 corresponding to the host allocation is decremented. At step 208 ring entry of the temporary receive ring 98r is transferred to the location of the current FREE location in the host transmit ring 94t. This arbitration process is indicated by the steps outlined by box 116, labelled HA in FIG. 11 and the result of this transition is shown in FIGS. 8 and 11 by arrow 199.

Figure 12:
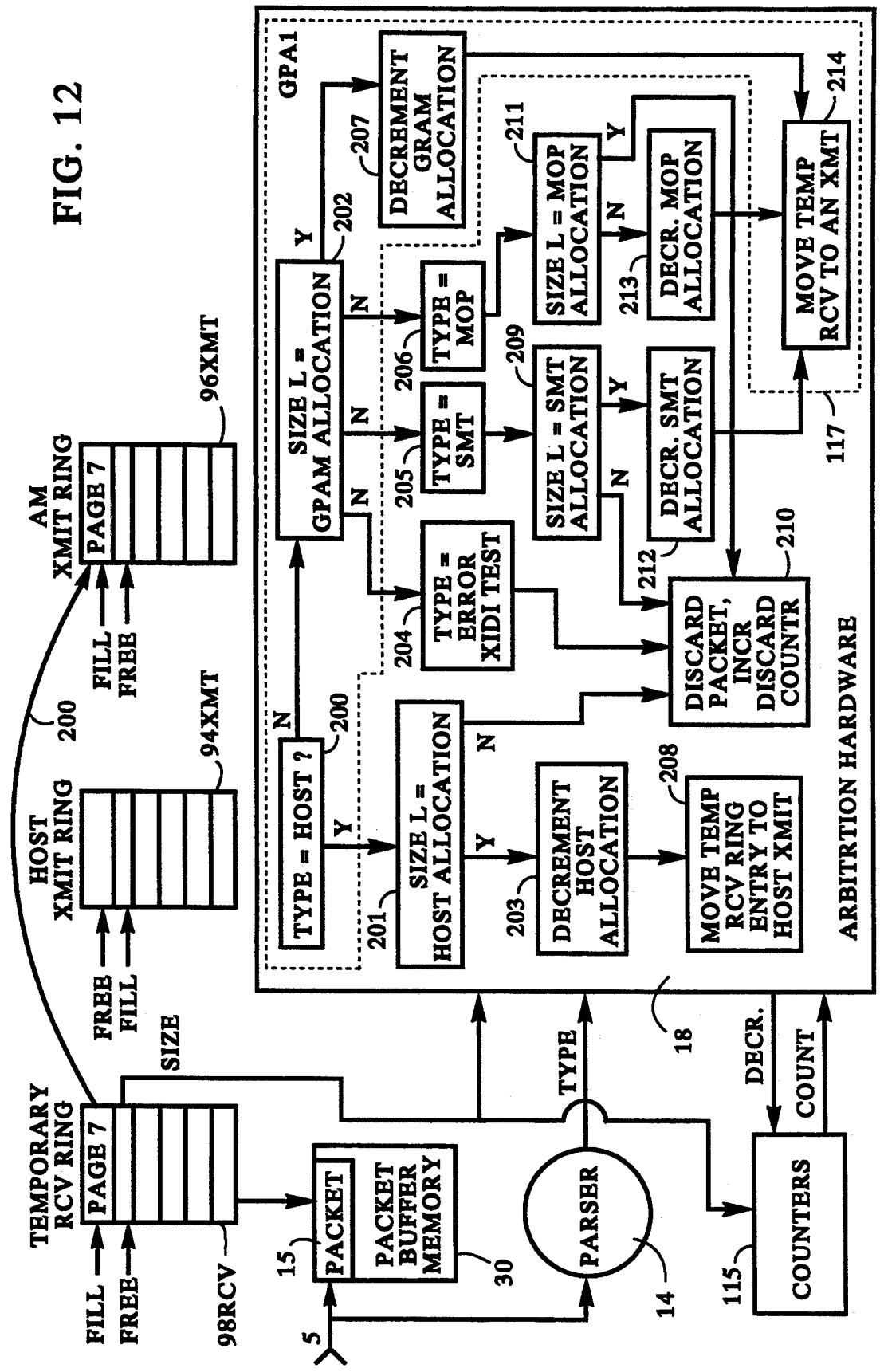
FIG. 12 is a block diagram showing the transfer of a packet pointer from the temporary buffer ring to the adapter manager buffer ring utilizing the GPAM allocation.

However, at step 200 it is determined that the packet 15 stored in the temporary receive ring 98r is a station management type, the arbitration hardware 18 functions to ensure that the packet is not discarded. Initially, at step 202 the GPAM allocation amount is compared with the packet size information from the buffer descriptor field 92 of the ring entry of the temporary receive ring 98r. If there is an adequate number of pages remaining in the GPAM allocation amount to store the packet designated by that ring entry, the GPAM allocation amount is decremented by the packet size, and the temporary receive ring entry 98r is transferred to the ring entry of the adapter manager transmit ring 96t designated by the adapter manager FILL pointer. The FREE pointer is then incremented to point to the next available ring entry for receiving ring entries from other rings. The arbitration process for this transaction is indicated by the box 117, labelled GPA1, in in FIG. 12. The transfer of the ring entry from the temporary receive ring 98r to the ring entry of the adapter manager transmit ring 96t is designated by arrow 200 in FIGS. 8 and 12.

Figure 13:
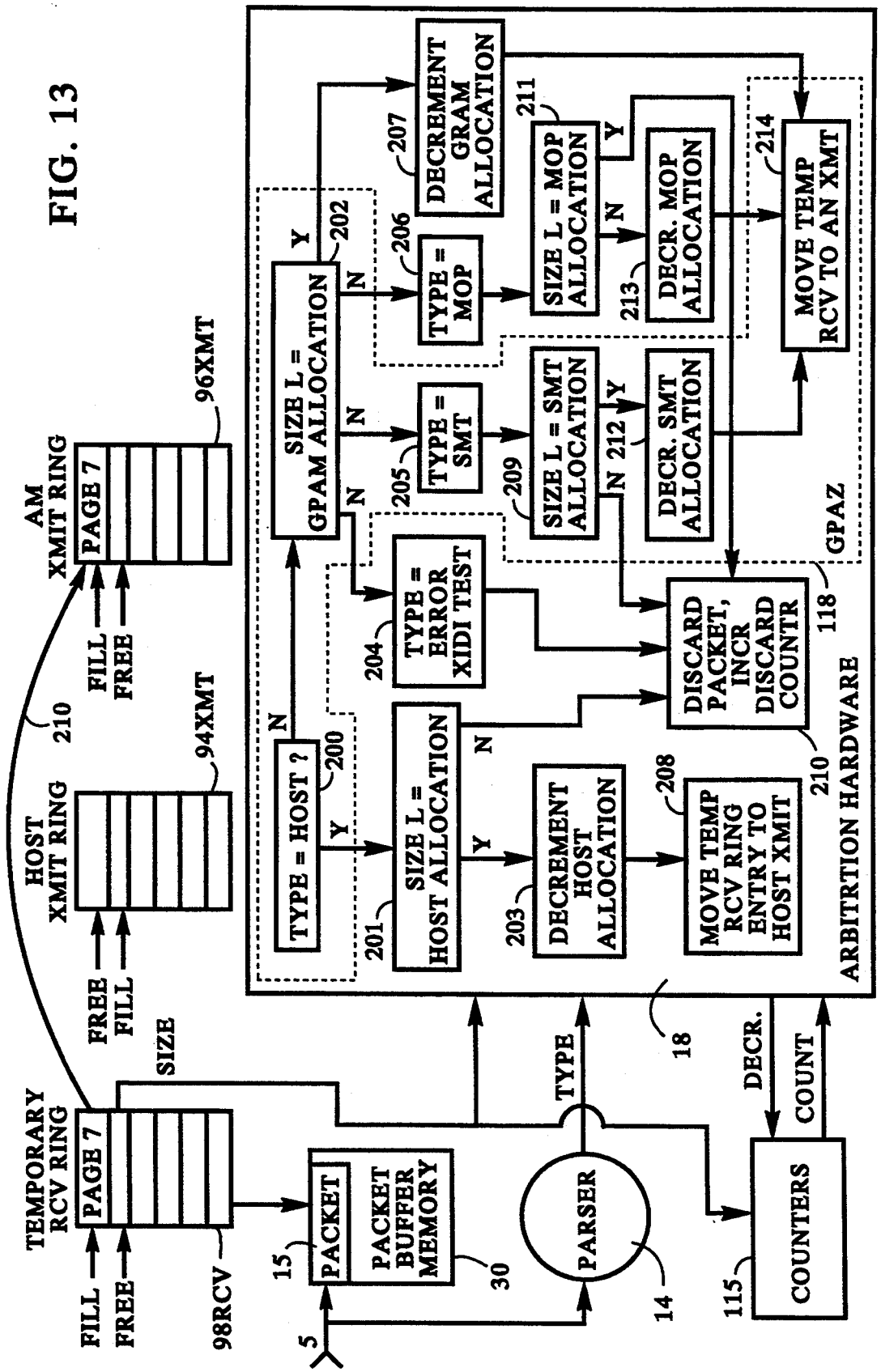
FIG. 13 is a block diagram showing the transfer of a packet pointer from the temporary buffer ring to the adapter manager buffer ring utilizing the station management allocation.

In the event there is an insufficient number of pages remaining in the GPAM allocation to allow for storage of the station management packet designated by the ring entry of the temporary receive ring 98r, a second step is taken to ensure receipt of the packet. This arbitration process is outlined in box 118, labelled GPA2 in FIG. 13. Once it has been determined at step 202 that there is inadequate storage space within the GPAM allocation, and providing at step 205 the packet has been determined by the arbitration hardware 18 to be a station management type packet, at step 209 the station management allocation amount is compared against the buffer descriptor size field cf the packet referenced by the pointer of the temporary receive ring 98r. If the comparison at step 209 indicates that there is sufficient storage space remaining in the station management allocation 33 to store the packet, at step 212 the station management allocation amount is decremented by the size indicated in the buffer descriptor field of the ring entry of the temporary receive ring 98r, and step 214 that ring entry is transferred to the location in the adapter manager transmit ring 96t designated by the FILL pointer. The transfer of the ring entry is shown in FIGS. 8 and 13 by arrow 210. In the event that at step 209 it is determined that there is not enough space remaining in the station management allocation 33 to accommodate the packet, at step 210 the packet is discarded. Similar arbitration process would be followed in the event that the packet is a MOP type packet, with references to station management allocation 33 in the immediately preceding description being replaced by references to MOP allocation 34. Thus, the station management and MOP allocations act as overflow allocations to provide an added safeguard that the critical station management and MOP packets are received.

By providing a shared data structure, the overhead of copying data between buffers in the same memory block is eliminated. In addition, the overflow allocations for the MOP and station management packets enhances system reliability by providing increased, selectively available capacity for receipt of critical system packets.

Although the above description has proceeded with reference to memory management in a packet-switched token ring adapter, it is to be understood that the invention may be used in other networks and applications where it is desirable to arbitrate incoming data types and provide selective allocation of memory to enhance system reliability.

While there has been shown and described a preferred embodiment, it is to be understood that various other adaptations and modifications may be made within the spirit and scope of the invention as defined by the appended claims.

What is claimed is:

1. Memory management apparatus comprising:
   input means for receiving a plurality packets from a network, wherein said plurality of packets comprises a plurality of different types of packets and wherein each packet of said plurality of packets comprises a group of data bits, wherein said input means further comprises:
   means for determining a type of said received packet from said plurality of different types of packets;
   a first memory, coupled to said input means, dedicated to storing packets of a first predetermined type, said first memory having a predetermined storage capacity;
   a second memory, coupled to said input means, dedicated to storing packets of said first predetermined type;
   memory selection means, coupled to said input means and said first and second memory, for transferring packets having said first predetermined type from said input means to said first memory until said predetermined storage capacity is full; and responsive to a full condition of said first memory for transferring packets of the first predetermined type, from said input means to said second memory;
   a third memory for temporarily storing said received packets until said type of said received packet is determined from said plurality of different types of packets; and wherein said memory selection means further comprises:
   first pointer buffer means for storing a plurality of pointers corresponding to packet locations in said first memory;
   second pointer buffer means for storing a plurality of pointers corresponding to packet locations in said second memory; and
   third pointer buffer means for storing a plurality of pointers corresponding to packet locations in said third memory, wherein said received packets are transferred from said third memory to said first and second memories by transferring a pointer contained in said third pointer buffer means to said first pointer buffer means and second pointer buffer means respectively.

2. Memory management apparatus according to claim 1, wherein said first memory, said second memory, and said third memory comprise respective first, second, and third memory allocations in a common memory.

3. A method comprising the steps of:
   providing a plurality of buffers for allocating storage space in a memory coupled to a network, each of said plurality of buffers for storing a corresponding plurality of types of packets received from said network;
   for each of a predetermined plurality of types of packets, providing a dedicated overflow allocation of memory locations in said memory to increase the available storage space for said predetermined plurality of types of packets received from said network;
   receiving a plurality of packets from a network;
   storing said received packet in a temporary buffer;
   determining a type of said received packet stored in said temporary buffer;
   comparing a size of said received packet stored in said temporary buffer against available storage space in the buffer of said plurality of buffers which corresponds to the determined type of said received packet;
   transferring said packet stored in said temporary buffer to the buffer corresponding to the determined type of said received packet if there is sufficient space to store said packet in said buffer; and
   transferring said packet stored in said temporary buffer to said dedicated overflow allocation corresponding to the determined type of packet if said packet is one of said predetermined types of packets and there is insufficient space to store said packet in said buffer corresponding to the determined type of said received packet, wherein said step of transferring further comprises the steps of:
   storing in a first pointer buffer a plurality of pointers corresponding to packet locations in the plurality of buffers;
   storing in a second pointer buffer a plurality of pointers corresponding to packet locations in said dedicated overflow allocations; and
   storing in a third pointer buffer a plurality of pointers corresponding to packet locations in said temporary buffer, wherein said received packets are transferred from said temporary buffer to said plurality of buffers and dedicated overflow allocation by transferring a pointer contained in said third pointer buffer to said first pointer buffer and second pointer buffer respectively.

4. The method of claim 3 further comprising the step of discarding the packet stored in said temporary buffer is there is insufficient space to store said packet in said storage allocation corresponding to said determined type of said received packet and said type of said packet is not one of said predetermined types of packets having said overflow allocation.

5. Memory management apparatus comprising:
   input means, coupled to a network, for receiving a plurality of packets, each packet comprising groups of data bits, wherein said plurality of packets comprise packets having a plurality of different types, wherein said input means includes means for determining a type of a received packet from said plurality of different types of packets, one of said packet types having a primary categorization and at least two secondary categorizations;
   a first memory, coupled to said input means, dedicated to storing packets having said primary categorization type, said first memory having a predetermined storage capacity;

a second memory, coupled to said input means, dedicated to storing said received packets having said primary categorization type and having one of said secondary categorizations;

a third memory, coupled to said input means, dedicated to storing said received packets having said primary categorization type and having a different one of said secondary categorizations; and memory selection mean, coupled to said input means, said first memory, said second memory and said third memory, for transferring said received packets having said primary categorization from said input means to said first memory until said predetermined storage capacity is full, responsive to a full condition of said first memory for transferring said received packets of the type having both said primary and said one of said secondary categorizations, from said input means to said second memory, and responsive to a full condition of said first memory for transferring said received packets having both said primary and said different one of said secondary categorizations, from said input means to said third memory.

* * * * *